Patented May 11, 1948

2,441,433

UNITED STATES PATENT OFFICE 2,441,433

INSECTICIDES

Edward R. McGovran, Hyattsville, Md., and Wilbur A. Gersdorff, McLean, Va., dedicated to the free use of the People in the territory of the United States No Drawing. Application June 21, 1946, Serial No. 678,189

3 Claims. (Cl. 167—24)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

We hereby dedicate the invention herein described to the free use of the People in the territory of the United States to take effect on the granting of a patent to us.

This invention relates to insecticides and has among its objects the provision of insecticidal compositions which in use are harmless to man and to domestic animals and which are non-injurious to buildings, furnishings and equipment, but which are highly toxic to insects.

For this purpose, we have used a composition comprising pyrethrum and 1,3 diphenoxypropane, in varying proportions, in combination with a carrier. By actual tests, we have found that the toxic effect of a combination of the above ingredients is greatly in excess of the additive effect to be expected from the known toxic effect of these ingredients when used independently. The results of these tests are illustrated by the following table:

Houseflies, Musca domestica

| Per cent in Kerosene | | Per cent Mortality |
|---|---|---|
| 1.3 Diphenoxypropane | Pyrethrum | |
| 5.0 | 0.05 | 85 |
| 1.0 | 0.05 | 74 |
| 0 | 0.05 | 36 |
| 2.5 | 0 | 1 |

The composition of this invention may be combined with carriers, such as water, acetone, liquefied dichlorodifluoromethane, kerosene, liquefied dimethyl ether, oleates, caseinates, talc, gypsum, bentonite, kaolin, slate dust, lime, rosin, pyrophyllite, and diatomaceous earth, and may be applied by spraying, atomizing, dusting, as an aerosol, and so forth, so as to bring it into contact with the insects to be destroyed. The composition may be used in dwelling houses, barns, restaurants, hotels, and in other places frequented by man and domestic animals without annoyance, harm or injury thereto, but with toxic effect upon insects found therein, and it may be applied to bodies of water to destroy noxious insect life found there.

The above examples are not to be construed as limiting the proportions or concentrations of the ingredients used in the composition of this invention, nor as limiting either the application of this novel insecticide or the kinds of insects to which it may be applied.

Having thus described our invention, we claim:

1. An insecticidal composition comprising pyrethrum and 1,3 diphenoxypropane.

2. An insecticidal composition comprising pyrethrum and 1,3 diphenoxypropane incorporated in a carrier.

3. The process of destroying insects comprising subjecting the insects to the action of pyrethrum combined with 1,3 diphenoxypropane.

EDWARD R. McGOVRAN.
WILBUR A. GERSDORFF.

REFERENCES CITED

The following references are of record in the file of this patent:

UNITED STATES PATENTS

| Number | Name | Date |
|---|---|---|
| 2,330,234 | Moyle | Sept. 28, 1943 |